United States Patent
Noll Barreto et al.

(10) Patent No.: US 6,223,048 B1
(45) Date of Patent: Apr. 24, 2001

(54) METHOD OF GENERATING A FREQUENCY-HOPPING SEQUENCE FOR RADIO COMMUNICATION, AS WELL AS RADIO FACILITY AND RADIO COMMUNICATION SYSTEM THEREFOR

(75) Inventors: André Noll Barreto; Jürgen Deissner, both of Dresden (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/211,008

(22) Filed: Dec. 15, 1998

(30) Foreign Application Priority Data

Dec. 16, 1997 (DE) .................................... 197 55 831

(51) Int. Cl.$^7$ ...................... H04Q 7/20; H04Q 7/38
(52) U.S. Cl. ................. 455/517; 455/450; 455/422; 455/451; 455/452; 455/454; 455/464; 455/509; 455/517; 375/132; 375/133; 375/135; 375/136; 370/330; 370/436; 370/478
(58) Field of Search ........................ 455/450, 422, 455/451, 452, 434, 454, 464, 509, 517, 524; 375/132, 133, 135, 136, 141; 370/330, 436, 478

(56) References Cited

U.S. PATENT DOCUMENTS 5,257,398   10/1993  Schaeffer .......................... 375/132

5,881,094 * 3/1999 Schilling ............................. 455/524

FOREIGN PATENT DOCUMENTS

WO 95/20844   8/1995  (WO).

OTHER PUBLICATIONS

M. Mouly, "The GSM: System for Mobile Communications", 1992, pp. 218–224.

ETSI Standard GSM 05.02, Version 5.1.0.

* cited by examiner

*Primary Examiner*—Lee Nguyen
*Assistant Examiner*—Keith Ferguson
(74) *Attorney, Agent, or Firm*—Sughrue, Mion, Zinn, Macpeak & Seas, PLLC

(57) ABSTRACT

In a GSM (Global System for Mobile communications) system, a lookup table used to scramble intermediate results in a pseudorandom fashion is also used to uniquely associate radio facilities with one another, particularly to associate mobile stations with a base station. Several different lookup tables (RNTBLi) may be used which are uniquely assigned to the radio facilities, with the intercommunicating radio facilities being assigned the same lookup table. The different lookup tables are preferably generated on the basis of subscriber identifications, whereby each subscriber is assigned a respective one of the lookup tables. The invention is particularly suited for the construction of private radio communication systems

10 Claims, 2 Drawing Sheets

Figure 1:
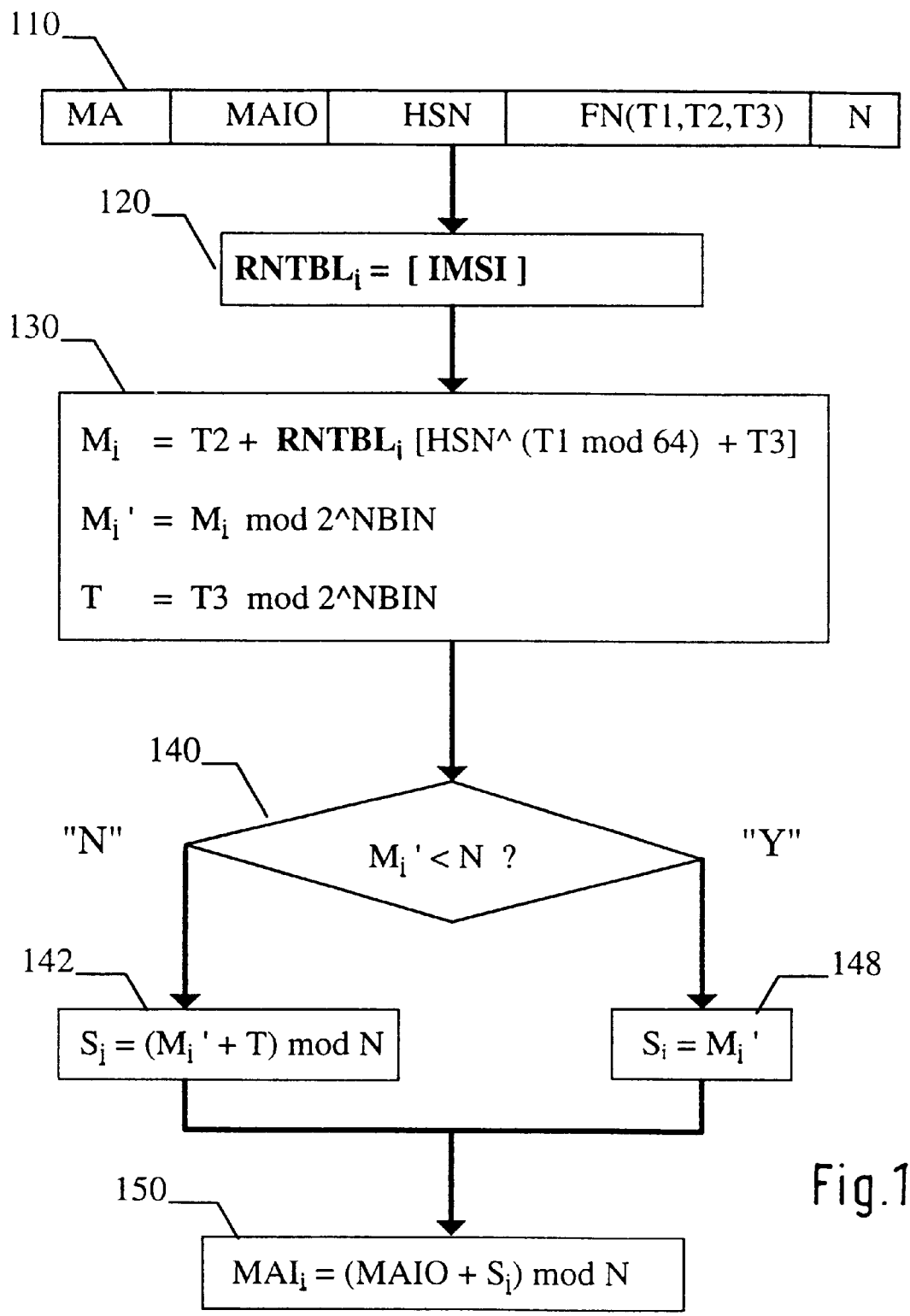

METHOD OF GENERATING A FREQUENCY-HOPPING SEQUENCE FOR RADIO COMMUNICATION, AS WELL AS RADIO FACILITY AND RADIO COMMUNICATION SYSTEM THEREFOR

This invention relates to a method of generating a frequency-hopping sequence as set forth in the preamble of claim 1 as well as to a radio facility which communicates with another radio facility in accordance with the frequency-hopping sequence and to a radio communication system comprising such radio facilities as set forth in the preambles of the respective independent claims.

Radio communication systems are known in which radio transmission between radio facilities takes place on several allocated carrier frequencies, with the radio facilities changing between the allocated carrier frequencies. This method of radio transmission is known as "frequency hopping". A well-known radio communication system using frequency hopping is the GSM system (Global System for Mobile Communications).

In a book by M. Mouly, "The GSM System for Mobile Communications", published by the author in 1992, Palaiseau, France, the structure and operation of GSM are described in detail. In Chapters 4.2.2.2 and 4.2.2.3, on pages 218 to 224, a method of generating a frequency-hopping sequence is described: The so-called Mobile Allocation Index (MAI), i.e., data on the carrier frequencies to be allocated, is determined. Input data for this determination are, for example, the Mobile Allocation Index Offset (MAIO) and the Hopping Sequence Number (HSN).

From the ETSI Standard GSM 05.02, version 5.1.0, a method of generating a frequency-hopping sequence is known which involves determining the above-mentioned MAI (Mobile Allocation Index), which specifies the carrier frequency to be allocated within a carrier unit. As described in Secton 6.2.3 and shown in FIG. 6 of GSM 05.02, the known method comprises the following steps. First, input data are determined which specify at least the number of available carrier frequencies, N, and a frequency-hopping scheme to be used, HSN. The number N of available carrier frequencies varies between 1 and 64, and the hopping sequence number HSN indicates which of 64 possible frequency-hopping schemes is used. As can be seen in FIG. 6, further input data are: MA (Mobile Allocation) and FN (Frame Number) with the parameters T1 to T3. From these input data, the hopping sequence is generated by calculating the MAI (Mobile Allocation Index) for each time interval using the algorithm shown on page 17 and in FIG. 6 of GSM 05.02. The input data are obtained from a lookup table RNTABLE (see GSM 05.02, page 17). This lookup table contains a pseudorandom association of 114 input values (addresses from 000 to 113) with 128 output values (contents from 0 to 127). The pseudorandom association causes intermediate results produced by the algorithm to be scrambled (see "look-up table" in FIG. 6).

The invention is predicated on recognition that the lookup table, which is known per se, can also serve to identify those radio facilities which are in radio communication with one another, and thus to associate these radio facilites with one another.

According to the invention, therefore, several different lookup tables are created, with those radio facilities which are in radio communication with one another being assigned the same lookup table. This means that the known method of generating a frequency-hopping sequence is improved in that several different lookup tables are accessed to establish a unique association between the intercommunicating radio facilities.

This has the advantage that the association between the radio facilities not only is established on the basis of usual identification codes, such as the subscriber identification IMSI (International Mobile Subscriber Identity) or the device code IMEI (International Mobile Equipment Identity), but is improved by a further criterion, namely by the different lookup tables.

With the measures according to the invention, it is possible not only to improve the unique association between the radio facilities, but also to form a radio communication system which differs from the conventional GSM mobile communications system in that it uses several different lookup tables. The newly formed radio communication system is therefore particularly suited for private radio communication using conventional GSM hardware, with new software (modified algorithm) being used to generate the frequency-hopping sequence.

The radio communication system according to the invention therefore comprises means for calculating the frequency-hopping sequence which access several different lookup tables, and radio facilities comprising storage means in which these lookup tables are stored in such a way that the intercommunicating radio facilities contain the same lookup table. Also proposed is a radio facility for the radio communication system which includes a means suitable for calculating the frequency-hopping sequence and a suitable storage means.

Further advantageous features of the invention are defined in the subclaims.

Advantageously, the different lookup tables are matrices whose input vectors are assigned to one output vector each, with the output vectors of the different matrices being orthogonal to each other. This ensures that interference between the radio facilities, which operate in a frequency-hopping mode, is minimized.

If the radio facilities are represented by at least one base station and at least two mobile stations, each of the mobile stations will advantageously contain a lookup table whose pseudorandom association is dependent on a subscriber identification. This subscriber identification identifies the subscriber who is using the mobile station. This means that each subscriber in the radio communication systems is assigned a separate lookup table.

It is also advantageous to assign to each mobile station a lookup table whose pseudorandom association is dependent on the device code of the mobile station. In this manner, each radio facility is unambiguously assigned a respective one of the lookup tables.

Furthermore, it is advantageous to store all lookup tables of the mobile stations in the base station, so that all mobile stations can communicate with this base station. In this connection it is also conceivable to use several base stations, of which individual ones contain only a limited set of lookup tables. This makes it possible to assign the mobile station to a subset of base stations ("group assignment").

A further advantage results if the storage means of the mobile station contains not only the lookup table for radio communication with the above base station but also a further lookup table for radio communication with a base station of a second mobile communication system. A radio facility is thus proposed which can communicate both with the first mobile communication system (for example a private radio communication system) and with a second mobile communication system (for example a public radio communication system, such as GSM). The hardware of such a radio facility corresponds essentially to that of a conventional radio facility for the second mobile communication system.

Figure 2:
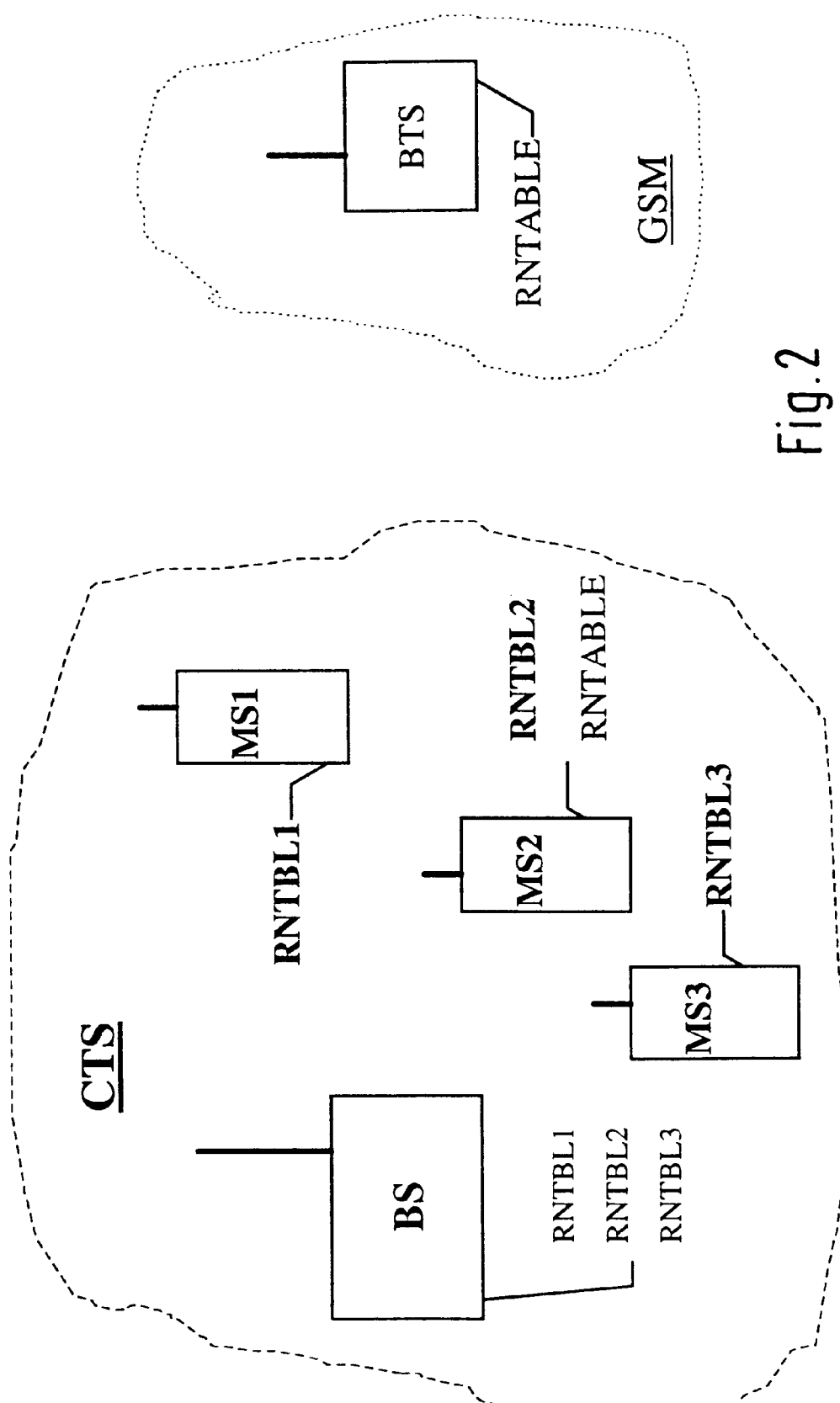

The invention will become more apparent from the following description of an embodiment when taken in conjunction with the accompanying drawings, in which:

FIG. 1 is a flowchart showing the steps of a method according to the invention; and FIG. 2 shows schematically the structure of a private mobile communication system in the vicinity of a public mobile communication system.

FIG. 1 is a flowchart showing the steps 110 to 150 of a method 100 according to the invention. The method serves to generate a frequency-hopping sequence for radio communication between radio facilities which periodically change between the allocated carrier frequencies. An example of the radio communication system will be described later with the aid of FIG. 2.

The method 100 shown in FIG. 1 begins with a first step 110, in which the following input data are determined: a first input datum MA (Mobile Allocation), which indicates the carrier frequencies that may be used within a cell, a second input datum MAIO (Mobile Allocation Index Offset), which indicates the frequency offset with which the hopping sequence is to be traversed, a third input datum HSN (Hopping Sequence Number), which indicates that of a total of 64 possible frequency-hopping schemes which is to be used, a fourth input datum FN (Frame Number), which indicates the frame number, and a fifth input datum N, which indicates the number of frequencies available in the overall system. The fourth input datum FN is defined more precisely by three parameters, namely by T1, which indicates the number of the frame to be used within a so-called superframe, by T2, which indicates the frame number within a so-called traffic frame, and by T3, which indicates the frame number within a so-called signaling frame.

In a next step 120, one of several different lookup tables RNTBLi is accessed, in this example the lookup table assigned to the user of the mobile station. This means that the lookup table now being used is dependent on the subscriber identification code IMSI. The use of the lookup table serves to scramble the intermediate results before carrying out a further step 130. This means that the method 100 proposed herein differs from the known method (see GSM 05.02, FIG. 6) in that several different lookup tables are now available, one of which is selected, preferably in dependence upon the subscriber identification code.

In the further step 130, the scrambled intermediate results are combined with other data. First, a number Mi is calculated as follows: $Mi=T2+RNTBLi[HSN^{(T1\ mod\ 64)}+T3]$. Then, the remainder is determined for this number Mi and a new number Mi' is calculated by the following modulo operation: $Mi'=Mi\ mod\ 2^{NBIN}$. In addition, a parameter to be used later, T, is calculated from the parameter T3 by the following equation: $T=T3\ mod 2^{NBIN}$.

In a further step 140, the calculated number Mi' is compared with the number N to determine whether Mi' is less than N, i.e., whether the calculated number Mi' is less than the number N of available carrier frequencies.

If Mi' is less than N, in a step 148, an intermediate result to be used later, Si, will be set equal to this Mi' (Si=Mi'). If Mi' is not less than N, in a step 142, the intermediate result Si will be calculated as follows: Si=(Mi'+T) mod N.

In a subsequent, final step 150, the calculated intermediate result Si serves to calculate the index MAIi from the formula: MAI=(MAIO+Si) mod N. The MAI (Mobile Allocation Index) calculated in step 150 corresponds to the carrier frequency to be allocated in the current time slot (e.g., carrier "3"). From this information, the absolute frequency value, i.e., the number within the frequency band which specifies the carrier to be allocated (e.g., 935.4 MHz), can be calculated. The absolute frequency value is denoted in GSM 05.02 by RFCN (Radio Frequency Channel Number).

When comparing the above-described method 100 with the conventional method according to GSM 05.02, it is apparent that several different lookup tables are accessed (step 120) to incorporate, in addition to the scrambling of the intermediate results, which is known per se, the identity of the mobile station. This means that the frequency-hopping sequence used by the mobile station is generated with the aid of a lookup table uniquely assigned to this mobile station. This lookup table can be identified by evaluating the subscriber identification code IMSI or, for example, the device code IMEI (International Mobile Equipment Identity) of the mobile station. The method described with reference to FIG. 1 is carried out in the radio communication system which will now be described with reference to FIG. 2.

FIG. 2 shows schematically the structure of a radio communication system according to the invention, CTS, which is located in the neighborhood of a conventional radio communications system GSM. The communication system CTS is a mobile radio system for private radio communication and contains a base station BS and several mobile stations MS1 to MS3.

Each of the mobile stations is assigned a respective lookup table; in this example, the lookup table RNTBL1 is assigned to mobile station MS1, the lookup table RNTBL2 to mobile station MS2, and the lookup table RNTBL3 to mobile station MS3. The base station BS contains all of the three different lookup tables RNTBLi, with i={1, 2, 3}. Accordingly, radio communication can take place in a multiple access mode, with the mobile stations and the base station periodically changing their carrier frequencies by frequency hopping. By the individually assigned, different lookup tables it is ensured that the mobile stations do not interfere with each other and that the mobile radio system CTS does not interfere with neighboring mobile radio systems. Neighboring mobile radio systems may be conventional systems, but also systems in accordance with the invention. In the embodiment of FIG. 2, the radio communication system CTS is in the vicinity of the public mobile radio system GSM, symbolized in FIG. 2 by a base transceiver station BTS. In this conventional mobile radio system GSM, only a single lookup table RNTABLE is used.

In addition to containing the lookup table RNTBLE2 assigned to it at least one of the proposed mobile stations MS2 may advantageously contain the lookup table for the public mobile radio system GSM. Thus it is ensured that this mobile station MS2 can communicate with both mobile radio systems. The proposed mobile radio system CTS is advantageously based on essentially the same hardware as the conventional mobile radio system GSM. The mobile station MS2 can thus be of a very simple design, as only different software needs to be implemented.

The embodiment described relates to a mobile communications system. However, the invention is not limited to such radio communication systems. It can also be used in other radio communication systems using mobile radio facilities (for example in a tactical radio communication system). The mobile communication system described has just one base station. It is also possible to use two or more base stations, with preferably not all mobile stations being registrable with all base stations. Different groups of mobile stations can be formed by storing only a subset of the associated lookup tables in individual base stations. Besides the mobile station described, which also contains a lookup table for the public mobile radio network, a base station may be adapted for use in both a private mobile radio network and a public mobile radio network.

What is claimed is:

1. A method of generating a frequency-hopping sequence containing data on carrier frequencies to be allocated for radio communication between radio facilities which change between the allocated carrier frequencies at regular intervals, said method comprising the steps of:

determining input data which specify at least a number of available carrier frequencies and a frequency-hopping scheme to be used; and generating the frequency-hopping sequence from the input data using an algorithm according to which data on a carrier frequency to be allocated are calculated for each time interval by combining the input data and by accessing a lookup table containing a pseudorandom association of input values with output values for scrambling intermediate results produced by the algorithm in a pseudorandom fashion, characterized in that several different lookup tables are accessed, with the intercommunicating radio facilities being assigned the same lookup table.

2. A method as claimed in claim 1, characterized in that the different lookup tables are matrices whose input vectors are assigned to one output vector each, with the output vectors of the different matrices being at least approximately orthogonal to each other.

3. A method as claimed in claim 1, characterized in that the radio facilities are at least one base station and at least two mobile stations, and that each of the mobile stations is assigned one of the lookup tables whose pseudorandom association is dependent on a subscriber identification code which identifies a subscriber who is using the mobile station.

4. A method as claimed in claim 1, characterized in that the radio facilities are at least one base station and at least two mobile stations, and that each of the mobile stations is assigned one of the lookup tables whose pseudorandom association is dependent on the device code of the mobile station.

5. A method as claimed in claim 3 or 4, characterized in that the lookup tables are stored in the radio facilities, with the lookup tables of said at least two mobile stations being stored in said at least one base station (BS).

6. A method as claimed in claim 5, characterized in that a first mobile communication system is formed from the at least one base station and the mobile stations, and that in at least one of the mobile stations, both the lookup table for radio communication with the at least one base station and another lookup table for radio communication of a second mobile communication system are stored.

7. A radio communication system comprising radio facilities which change between carrier frequencies at regular time intervals in accordance with a frequency-hopping sequence containing data on the carrier frequencies to be allocated, and which comprise means for calculating the frequency-hopping sequence using an algorithm according to which the information on a carrier frequency to be allocated is calculated for each time interval by combining input data specifying at least a number of available carrier frequencies and a frequency-hopping scheme to be used and by accessing a lookup table containing a pseudorandom association of input values with output values for scrambling intermediate results produced by the algorithm in a pseudorandom fashion, characterized in that the means for calculating the frequency-hopping sequence access several different lookup tables, and that those radio facilities which are in radio communication with one another have storage means in which the same lookup table is stored.

8. A radio communication system as claimed in claim 7, characterized in that the radio facilities are at least one base station and at least two mobile stations, and that each of the mobile stations contains one of the lookup tables whose pseudorandom association is dependent on a subscriber identification code which identifies a subscriber who is using the mobile station.

9. A radio facility within a radio communication system wherein said radio facility and other radio facilities change at regular intervals between carrier frequencies allocated to them according to a frequency-hopping sequence containing data on the carrier frequencies to be allocated, said radio facility and said other radio facilities comprising means for calculating the frequency-hopping sequence using an algorithm according to which data on a carrier frequency to be allocated is calculated for each time interval by combining input data specifying at least a number of available carrier frequencies and a frequency-hopping scheme to be used and by accessing a lookup table which defines a pseudorandom association of input values with output values for scrambling intermediate results produced by the algorithm in a pseudorandom fashion, characterized in that the means for calculating the frequency-hopping sequence access several different lookup tables, and that the radio facility which is in radio communication with one (BS) of the other radio facilities have a storage means in which the same lookup table is stored as in said one other radio facility.

10. A radio facility as claimed in claim 9, characterized in that the radio facility is a mobile station which is in radio communication with said other radio facility, which is a base station of a first mobile communication system, and that the storage means of the mobile station contains both the lookup table for radio communication with said base station (BS) and another lookup table for radio communication with a base station of a second mobile communication system.

* * * * *